United States Patent [19]
Cohen

[11] 3,881,989
[45] May 6, 1975

[54] METHOD OF DETECTING A FUEL ELEMENT FAILURE
[75] Inventor: Paul Cohen, Pittsburgh, Pa.
[73] Assignee: The United States of America as represented by the United States Energy Research and Development Administration, Washington, D.C.
[22] Filed: July 23, 1973
[21] Appl. No.: 381,633

[52] U.S. Cl. ............................ 176/19 LD; 210/85
[51] Int. Cl. ........................................... G21c 17/04
[58] Field of Search ....... 176/19 R, 19 LD, 195, 37, 176/50, 65; 210/85; 250/336, 361, 374, 472, 473

[56] References Cited
OTHER PUBLICATIONS
"Control and Instrumentation" Section III Nuclear Safety, Vol. 4, No. 1, Sep. 1962, pp. 58–60.

Primary Examiner—Stephen C. Bentley
Attorney, Agent, or Firm—John A. Horan; Arthur A. Churm; Frank H. Jackson

[57] ABSTRACT
A method for detecting a fuel element failure in a liquid-sodium-cooled fast breeder reactor consists of equilibrating a sample of the coolant with a molten salt consisting of a mixture of barium iodide and strontium iodide — or other iodides — whereby a large fraction of any radioactive iodine present in the liquid sodium coolant exchanges with the iodine present in the salt; separating the molten salt and sodium; if necessary, equilibrating the molten salt with nonradioactive sodium and separating the molten salt and sodium; and monitoring the molten salt for the presence of iodine, the presence of iodine indicating that the cladding of a fuel element has failed.

4 Claims, 1 Drawing Figure

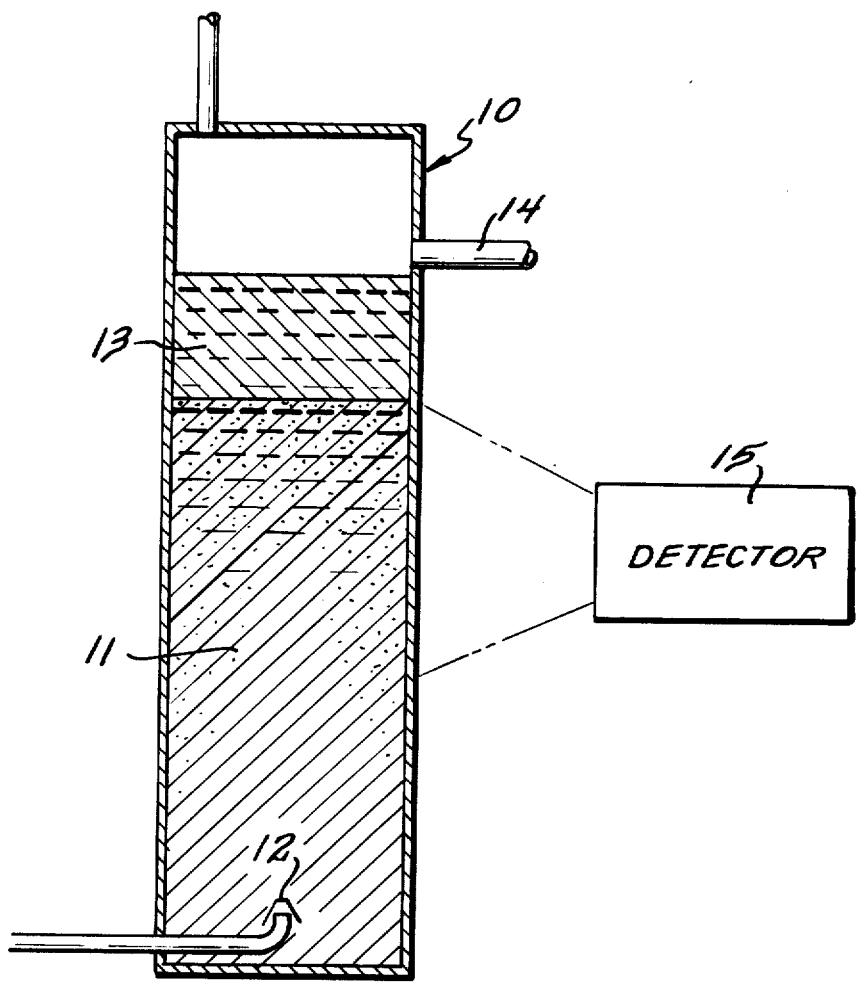

METHOD OF DETECTING A FUEL ELEMENT FAILURE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of detecting small quantities of radioactive iodine in the presence of large amounts of radioactive sodium. In more detail, the invention relates to a method of detecting a fuel element failure in a liquid-sodium-cooled fast breeder reactor.

Failures in the cladding of nuclear reactor fuel elements in nuclear reactors present very serious problems and can result in extensive and costly damage to the reactor as well as long periods of reactor shutdown. It is important, then, that such failures be detected easily and quickly so as to prevent serious damage.

In liquid-sodium-cooled nuclear reactors, fuel element cladding failures are accompanied by the release of fission products to the liquid sodium coolants These fission products are present in the form of gases and elemental or combined solids. The form and types of fission products which are released depend upon the type of fuel element failure. A cladding failure in the gas-containing plenum section of a fuel element may result only in the release of gaseous fission products such as xenon and krypton. Fission gas releases due to such plenum failures or "leakages" are not serious and do not result in damage to the reactor. However, a cladding failure wherein the sodium coolant enters the fuel element and contacts the fuel oxide therein is serious and can result in extensive damage if not detected quickly, its progression monitored and the defective fuel element removed when it becomes necessary. In such failures, the sodium and fuel oxide interact to cause swelling and weakening of the oxide structure, resulting in solid fission products being leached from the fuel by the sodium and released along with fission gases to the sodium coolant system. This type of failure can be tolerated to a certain extent. However, the failure's progression must be carefully monitored, for if it continues or increases in severity, the continued leaching can cause the disintegration of the fuel matrix and fuel particle washout through the failure. It is the presence of fuel particles in the sodium coolant which can cause severe damage and therefore must be avoided. Fuel particles in the cooling system can clog fuel channels, thereby increasing the temperature of the system, which can lead to further fuel element failures, creating a fuel element failure propagation. In addition, the highly radioactive fuel particles contaminate the entire coolant system and can become lodged in parts of the system, such as in pumps and heaters, which are normally not maintained entirely by remote means. This would create a dangerous safety problem as well as a maintenance problem, since these lodged particles with long half-lives would not drain out with the sodium as do soluble fission products. Clearly, then, a failure wherein sodium contacts the fuel oxide needs to be detected early and the failure's progression monitored carefully for indications of fuel washout imminency. When fuel washout becomes imminent, the reactor must be shut down and the failed fuel element removed.

Various techniques and procedures have been proposed and utilized in the past to detect fuel element failures. Techniques for monitoring the sodium coolant or sodium cover gas to determine the total decay activity of fission products present therein have been successful in detecting fuel element failures. However, these techniques have not proven entirely satisfactory due to their inability to differentiate between the decay activity of gaseous fission products resulting from "leakers" and the decay activity of dissolved solid fission products leached from the nuclear fuel during sodium-fuel oxide contact in the more serious fuel element failures. As a result, such monitoring techniques have necessitated numerous reactor shut-downs in the past merely from fission gas leaks in the fuel element plenum sections. Such shut-downs due to "leakers" are unnecessary, costly and result in a significant loss of reactor availability.

Delayed-neutron monitoring, wherein very short-lived halogen fission product isotopes such as $^{137}$I (23 sec) and $^{87}$Br (55 sec) are monitored by detecting the neutrons emitted during their decay, is another method which has been utilized to detect fuel element failures. This technique, however, has a very low sensitivity due to the short half-life of neutron precursors, resulting in the detection of only the most serious of fuel element failures and then only after a significant concentration of fission products, as well as fuel particles in the case of a rapid failure progression, has accumulated in the sodium coolant.

Halogens are one class of fission products which are leached readily from oxide fuels by sodium. Normally, iodine isotopes would be gaseous at the temperature of the oxide fuel outer surface. However, in the oxide matrix, fission product iodine does not exist in the elemental form because of its chemical reactivity. This causes it to react to form compounds with other fission products such as cesium and to form complex compounds with the fuel matrix. This lowers the volatility of the iodine isotopes and their tendency to escape from the fuel element interior as gases. Therefore, iodine isotopes do not normally escape from failed fuel elements which are leaking only fission gases. There is ample evidence of this in reactors where numerous fission gas releases are detected from cover gas evidence for which no iodine increase in the coolant is detectable by coolant sampling and chemical analysis. The monitoring of halogen isotopes in the sodium coolant, then, would be desirable in order to monitor fuel element failures which are significant in terms of sodium-fuel oxide contact. Unfortunately, direct detection of halogen isotopes in the sodium coolant by gamma ray analysis is impossible.

A different method for determining iodine activity in the coolant of a sodium-cooled fast breeder reactor is described in U.S. Pat. No. 3,733,249 dated May 15, 1973 and filed Nov. 2, 1971 by the assignee of the present application. According to U.S. Pat. No. 3,733,249, the iodine-135 activity level in the sodium coolant is monitored by measuring the activity of its daughter xenon-135m. This is accomplished by sparging a sample of the sodium coolant with an inert gas to remove gaseous fission products therefrom, continuing the sparge for a measured period of time, collecting this gas and

SUMMARY OF THE INVENTION

According to the present invention, the coolant of a sodium-cooled fast breeder reactor is monitored for the presence of radioactive iodine therein by equilibrating a sample of the coolant with a molten salt consisting of a mixture of iodides such as the eutectic mixture of barium iodide and strontium iodide, whereby any radioactive iodine ions present in the coolant exchange with iodine ions present in the salt, separating the molten salt from the sodium and monitoring the molten salt for the presence of iodine. If necessary, the molten salt is equilibrated with non-radioactive sodium before monitoring it for the presence of iodine.

BRIEF DESCRIPTION OF THE DRAWING

The single FIGURE of the drawing is a sketch of a system for carrying out the process of the present invention.

DETAILED DESCRIPTION OF THE INVENTION

As shown in the drawing, a column 10 is provided with heating means (not shown) to maintain a mixture 11 of barium iodide and strontium iodide present therein in a molten condition. A nozzle 12 at the bottom of the column is employed to introduce sodium into the column. Sodium is dispersed in the molten salt and mixes thoroughly therewith before rising to the top of the column where it separates into a layer 13 since it is immiscible with the molten salt. Sodium overflows from column 10 through overflow line 14 and an inert gas is employed in the column above the sodium layer. A shielded gamma ray detector and spectrometer 15 is employed to monitor the molten mixture of barium iodide and strontium iodide for radioactive iodine activity. It will be appreciated that other molten mixtures of nonradioactive iodides — such as mixtures including lithium iodide or calcium iodide — could also be used.

In accordance with this invention, a sample of sodium coolant — for example 1 to 100 grams — from a nuclear reactor is introduced into column 10 through nozzle 12 and mixed in any way desired with the molten salt present therein for a period of time sufficient to establish an equilibrium between the iodine present in the molten salt and any radioactive iodine present in the sodium. One or two minutes is sufficient. While sodium exchanges only slightly with the barium and strontium in the molten salt, most — 99.9% — of the iodine activity is accumulated in the salt. Thus removal of sodium through overflow line 14 removes to a considerable extent the source of radiation which masks the iodine activity so that activity caused by radioactive iodine — which can only be present as the result of a fuel element failure — can be detected on spectrometer 15.

Measurements of the equilibrium indicate that the decontamination factor will be $10^{-3}$ or better. If the original sodium activity is not too high, then the single treatment described will be sufficient to remove enough of the sodium activity to obtain a reading on iodine. If a reactor has not reached full equilibrium sodium activity after start-up, a single treatment may be satisfactory. If the original sodium activity is high, it is necessary to follow up the described treatment with another equilibration treatment wherein the molten salt remaining after the radioactive sodium has been drawn off from column 10 is equilibrated with about an equal volume of nonradioactive sodium. This is accomplished by introducing sodium into column 10 through nozzle 12 and mixing it with the molten salt for a sufficient length of time for an equilibrium to be established between the nonradioactive sodium thus introduced and the residual radioactive sodium in the molten salt. Removal of this sodium through overflow line 14 results in a total decontamination factor of $10^{-6}$ or better for the separation of radioactive sodium from any iodine activity that might be present and thus it is now possible to detect iodine activity with spectrometer 15 even though the sodium in which the iodine was originally present was highly radioactive.

The indicated manipulations can be performed manually in a shield box and the procedure is then a laboratory scheme for measuring iodine activity in sodium.

The procedure is especially suitable for making rapid determinations of iodine activity in highly radioactive sodium. Within the limitations of the chemical reactions, it can be used for an on-line monitor; that is, the same salt can be used for a number of cycles. It would be used as an on-line monitor by first flowing radioactive sodium from a sample ling through the salt mixture and stripping out radioactive iodine into the salt. This stream is then diverted and a stream of nonradioactive sodium is flowed through the salt to strip out the radioactive sodium. Although the monitor would not read continuously, it would avoid the external manipulation of samples.

In order to determine the feasibility of this process, tests were made on the compatibility of sodium and barium iodide. These tests were run to determine the quantity of reaction of sodium with the molten salt. If this reaction is too high, the method would fail because there would be too high a sodium activity in the salt, which would interfere with determination of the iodine radioactivity simultaneously introduced into the salt by isotopic exchange. The results and calculations based thereon indicate a reaction of $BaI_2 + Na \rightarrow Ba(Na) + NaI$ of about $10^{-3}$ mol fraction. Thus, while a reaction does occur, it is of tolerably low degree. The procedure employed follows:

1.5226 gm of $BaI_2 \cdot 2H_2O$ was dried in vacuo at about 1,100°F. for 4 hours to yield 1.3990 gm of $BaI_2$. 18.6 gm of high purity sodium were added to the $BaI_2$ in a Type 304 stainless steel crucible installed in an open Type 304 stainless retort with an electric stirrer in an argon glovebox ($O_2 \sim 2$ ppm; moisture $\sim 1$ ppm). The Na-$BaI_2$ mixture, heated by an electric clamshell heater, was held at 1,000°F. for 4 hours while the solution was continuously stirred. After 4 hours, the heater and stirrer were simultaneously shut off and the sodium allowed to freeze.

Three samples of the sodium, each about one-eighth inch in thickness, were removed successively from the crucible with a stainless steel spatula. The residue and remaining sodium were then treated with triple-distilled mercury to separate the residual salts from the sodium. The non-amalgamated residue was dissolved in distilled water, and evaporated to dryness. Chemical analyses for the sodium samples, residue, and amalgam are summarized in Table I.

TABLE I

| SAMPLE | SUMMARY OF CHEMICAL ANALYSES CHEMISTRY RESULTS | | | | CALCULATED | | Stoichiometry |
|---|---|---|---|---|---|---|---|
| | w/o Ba | w/o Na | w/o I | moles Ba/100 g | moles I/100 g | | moles I/100 g |
| 1 (0 - ⅛″)* | 0.73 | — | 2.73 | 0.0053 | 0.021 | | 0.011 |
| 2 (⅛″ - ¼″)* | 0.97 | — | 0.19 | 0.0071 | 0.0015 | | 0.0142 |
| 3 (¼″ - ⅜″)* | 0.47 | — | 0.12 | 0.0034 | 0.00095 | | 0.0068 |
| 4 Blank (Na before exp.) | 0.05 | | 0.04 | — | — | | — |
| 5 Hg amalgam | 2.74 mg** | | 1.04 mg** | — | — | | — |
| 6 Residue | 15.5 | 17.8 | 36.9 | 0.113 | 0.291 | | 0.226 |

*Each sample was about ⅛″ layer of Na scraped successively from the upper surface of the reaction crucible after the Na had frozen.
**Based on total in amalgam.

Examination of the barium and iodine concentrations in the three samples of sodium removed from the crucible after freezing indicate that metallic barium was present in samples 2 and 3 since the iodine in these samples is an order of magnitude less than the stoichiometric quantity if the barium were present as $BaI_2$. In sample 1, taken from the sodium surface, more than twice the iodine required to satisfy the $BaI_2$ stoichiometry was found. The excess iodine very likely results from NaI which was concentrated at the sodium-gas interface during freezing.

Analysis of the residue shows that there is 16% more iodine than is accounted for by the barium present. If this excess iodine is assumed to be NaI, then 0.139 gm of NaI would be present in the residue. The source of the remainder of the sodium in the residue is probably sodium which was adsorbed on the salt phase and did not amalgamate.

Material balances, on barium and iodine, Table II below, show discrepancies of −24% and −16%, respectively.

TABLE II

| MATERIAL BALANCES | Ba | I |
|---|---|---|
| Initial, gm | 0.491 | 0.908 |
| Na phase (ave.), gm | 0.134 | 0.188 |
| Residue, gm | 0.240 | 0.572 |
| (Na + Residue) - Initial, gm | −0.117 | −0.148 |
| % Discrepancy | −23.8 | −16.2 |

The apparent difference in material balances results in large part from inhomogeneities in the samples.

The embodiments of the invention in which an exclusive property or privilege is claimed are defined as follows:

1. A method of identifying small quantities of radioactive iodine in the presence of large quantities of radioactive sodium comprising equilibrating the radioactive sodium with a molten mixture of barium iodide and strontium iodide whereby the radioactive iodine present therein exchanges with the iodine present in the molten mixture, removing the radioactive sodium and monitoring the molten mixture for the presence of radioactive iodine.

2. A method of detecting a fuel element failure in a liquid-sodium-cooled fast breeder reactor comprising equilibrating a sample of the sodium coolant with a molten mixture of barium iodide and strontium iodide whereby any radioactive iodine in the sodium is accumulated in the molten salt by isotopic exchange, physically separating the sodium from the molten salt and monitoring the molten salt for the presence of radioactive iodine.

3. A method according to claim 2 wherein a eutectic mixture of barium and strontium iodides is employed.

4. A method according to claim 3 and including further equilibrating the molten salt with nonradioactive sodium whereby residual sodium radioactivity in the molten salt is in large part transferred to the sodium metal and physically removing the sodium metal.

* * * * *